United States Patent
Park et al.

(10) Patent No.: US 9,853,756 B2
(45) Date of Patent: Dec. 26, 2017

(54) MULTICAST OVER WIRELESS NETWORK WITH THE ASSISTANCE OF POWER-EFFICIENT PEER GROUP DISCOVERY

(71) Applicant: QUALCOMM Incorporated, San Diego, CA (US)

(72) Inventors: Vincent Park, Budd Lake, NJ (US); Perry Wintner, Brick, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 13/671,165

(22) Filed: Nov. 7, 2012

(65) Prior Publication Data

US 2014/0126453 A1    May 8, 2014

(51) Int. Cl.
| | |
|---|---|
| H04J 4/00 | (2006.01) |
| H04H 20/72 | (2008.01) |
| H04W 4/06 | (2009.01) |
| H04W 76/00 | (2009.01) |
| H04W 52/02 | (2009.01) |
| H04W 76/04 | (2009.01) |

(52) U.S. Cl.
CPC .............. *H04H 20/72* (2013.01); *H04W 4/06* (2013.01); *H04W 52/0219* (2013.01); *H04W 76/002* (2013.01); *H04W 52/0216* (2013.01); *H04W 76/048* (2013.01); *Y02B 60/50* (2013.01)

(58) Field of Classification Search
USPC ................ 370/244, 312, 328–329, 390, 465; 380/270
See application file for complete search history.

(56) References Cited

U.S. PATENT DOCUMENTS

| 7,301,914 B2 | 11/2007 | Segal et al. |
| 7,995,508 B2* | 8/2011 | Ruy et al. ...................... 370/311 |
| 2005/0213576 A1* | 9/2005 | Stephens ................. H04L 12/12 370/390 |

(Continued)

FOREIGN PATENT DOCUMENTS

| WO | WO2012025785 A1 | 3/2012 |
| WO | WO-2012074337 A2 | 6/2012 |

OTHER PUBLICATIONS

International Search Report and Written Opinion—PCT/US2013/068865—ISA/EPO—dated Apr. 24, 2014.

*Primary Examiner* — Edan Orgad
*Assistant Examiner* — Sithu Ko
(74) *Attorney, Agent, or Firm* — Arent Fox, LLP

(57) ABSTRACT

A method, an apparatus, and a computer program product for wireless communication are provided. The apparatus may be a data source determining to send a multicast transmission for a multicast group having a multicast group identifier, wirelessly communicating an expression with at least one node in the multicast group, the expression based on the multicast group identifier, and sending the multicast transmission to the at least one node. The apparatus may a data receiver determining to receive a multicast transmission for a multicast group having a multicast group identifier, wirelessly communicating an expression with a data source in the multicast group, the expression based on the multicast group identifier, and receiving the multicast transmission from the data source.

44 Claims, 10 Drawing Sheets

(56) References Cited

U.S. PATENT DOCUMENTS

| | | | |
|---|---|---|---|
| 2005/0254444 A1 | 11/2005 | Meier et al. | |
| 2005/0276237 A1* | 12/2005 | Segal | H04L 12/12 370/312 |
| 2006/0128433 A1* | 6/2006 | Liang | H04W 68/025 455/560 |
| 2006/0215601 A1* | 9/2006 | Vleugels et al. | 370/328 |
| 2007/0037548 A1* | 2/2007 | Sammour | H04W 52/0235 455/343.2 |
| 2007/0201468 A1 | 8/2007 | Jokela | |
| 2007/0248114 A1* | 10/2007 | Jia | H04B 1/71632 370/465 |
| 2007/0281665 A1* | 12/2007 | Cho | H04L 63/062 455/411 |
| 2008/0028211 A1* | 1/2008 | Tanizawa | H04L 63/065 713/163 |
| 2008/0181154 A1* | 7/2008 | Sherman | H04W 48/16 370/311 |
| 2009/0022078 A1* | 1/2009 | Patterson | G01D 21/00 370/311 |
| 2009/0097430 A1* | 4/2009 | Park | H04L 12/18 370/312 |
| 2009/0122742 A1* | 5/2009 | Goldberg | H04W 68/00 370/312 |
| 2009/0213760 A1* | 8/2009 | Shin et al. | 370/254 |
| 2009/0310503 A1* | 12/2009 | Tenny | H04W 68/00 370/252 |
| 2011/0161697 A1* | 6/2011 | Qi | G06F 1/3209 713/320 |
| 2012/0144445 A1* | 6/2012 | Bonta | H04L 12/1868 725/116 |
| 2012/0163600 A1* | 6/2012 | Kim et al. | 380/270 |
| 2013/0028163 A1* | 1/2013 | Hsiao | H04W 4/06 370/312 |
| 2013/0064161 A1* | 3/2013 | Hedayat | H04W 8/186 370/312 |
| 2013/0157656 A1* | 6/2013 | Gao | H04W 76/023 455/434 |
| 2013/0182581 A1* | 7/2013 | Yeung | H04L 12/1877 370/244 |

* cited by examiner

MULTICAST OVER WIRELESS NETWORK WITH THE ASSISTANCE OF POWER-EFFICIENT PEER GROUP DISCOVERY

BACKGROUND

Field

The present disclosure relates generally to communication systems, and more particularly, to assisting facilitation of multicast transmissions over a wireless network using power-efficient peer group discovery methods.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a data source determining to send a multicast transmission for a multicast group having a multicast group identifier, wirelessly communicating an expression with at least one node in the multicast group, the expression based on the multicast group identifier, and sending the multicast transmission to the at least one node.

In another aspect of the disclosure, the apparatus may a data receiver determining to receive a multicast transmission for a multicast group having a multicast group identifier, wirelessly communicating an expression with a data source in the multicast group, the expression based on the multicast group identifier, and receiving the multicast transmission from the data source.

DETAILED DESCRIPTION

Figure 1:
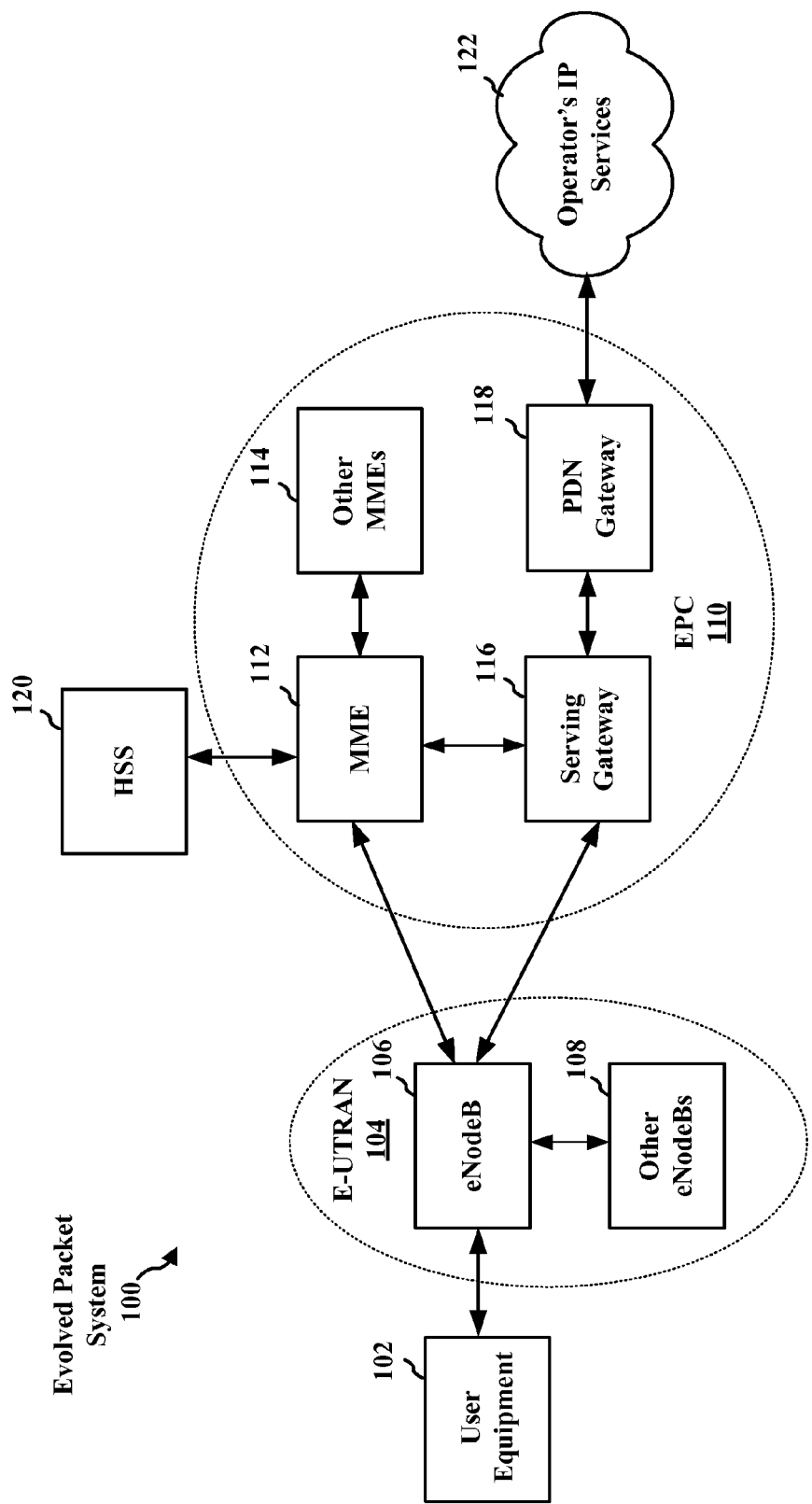
FIG. 1 is a diagram illustrating an example of a network architecture according to one embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108. The eNB 106 provides user and control plane protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
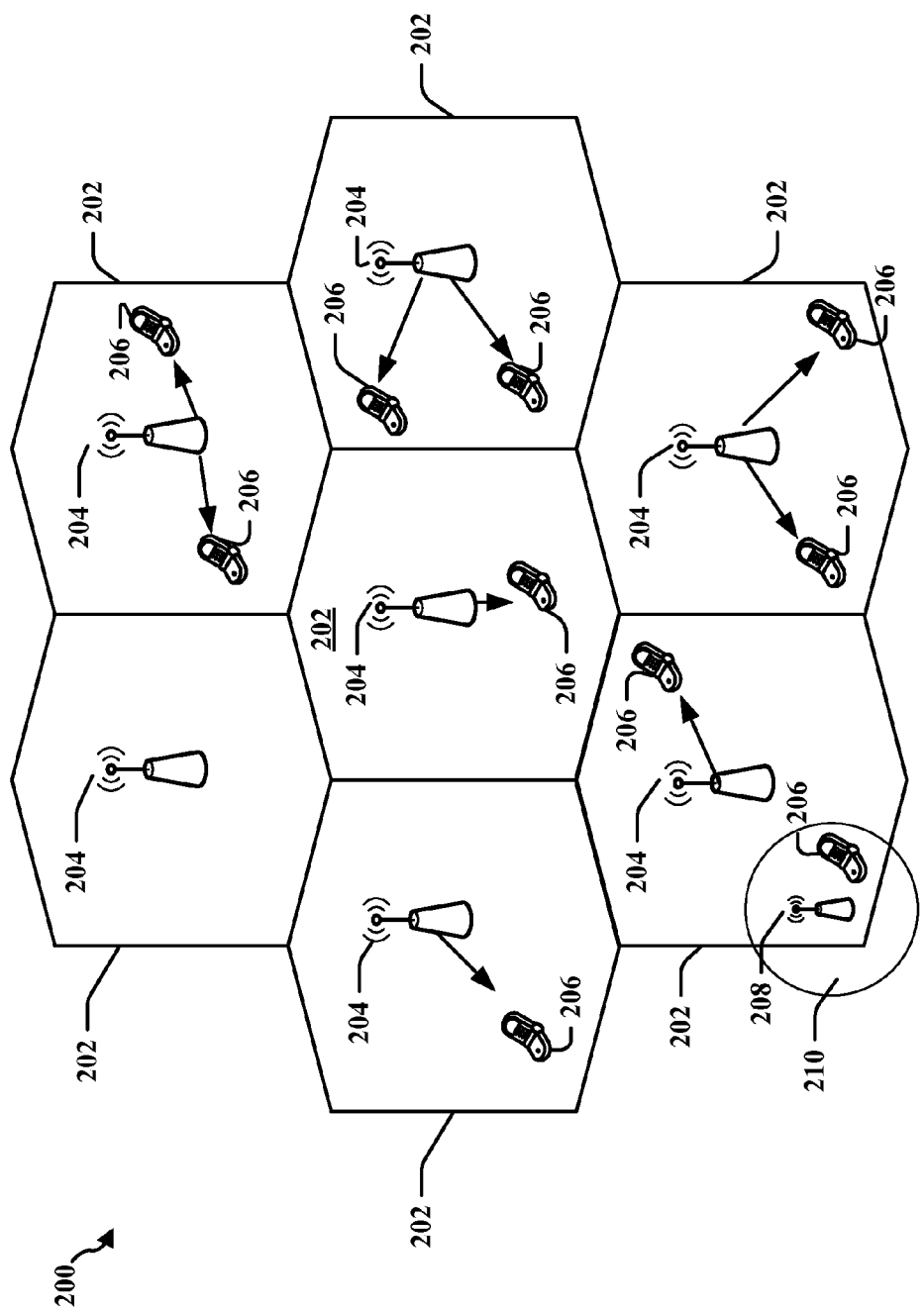
FIG. 2 is a diagram illustrating an example of an access network according to one embodiment.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
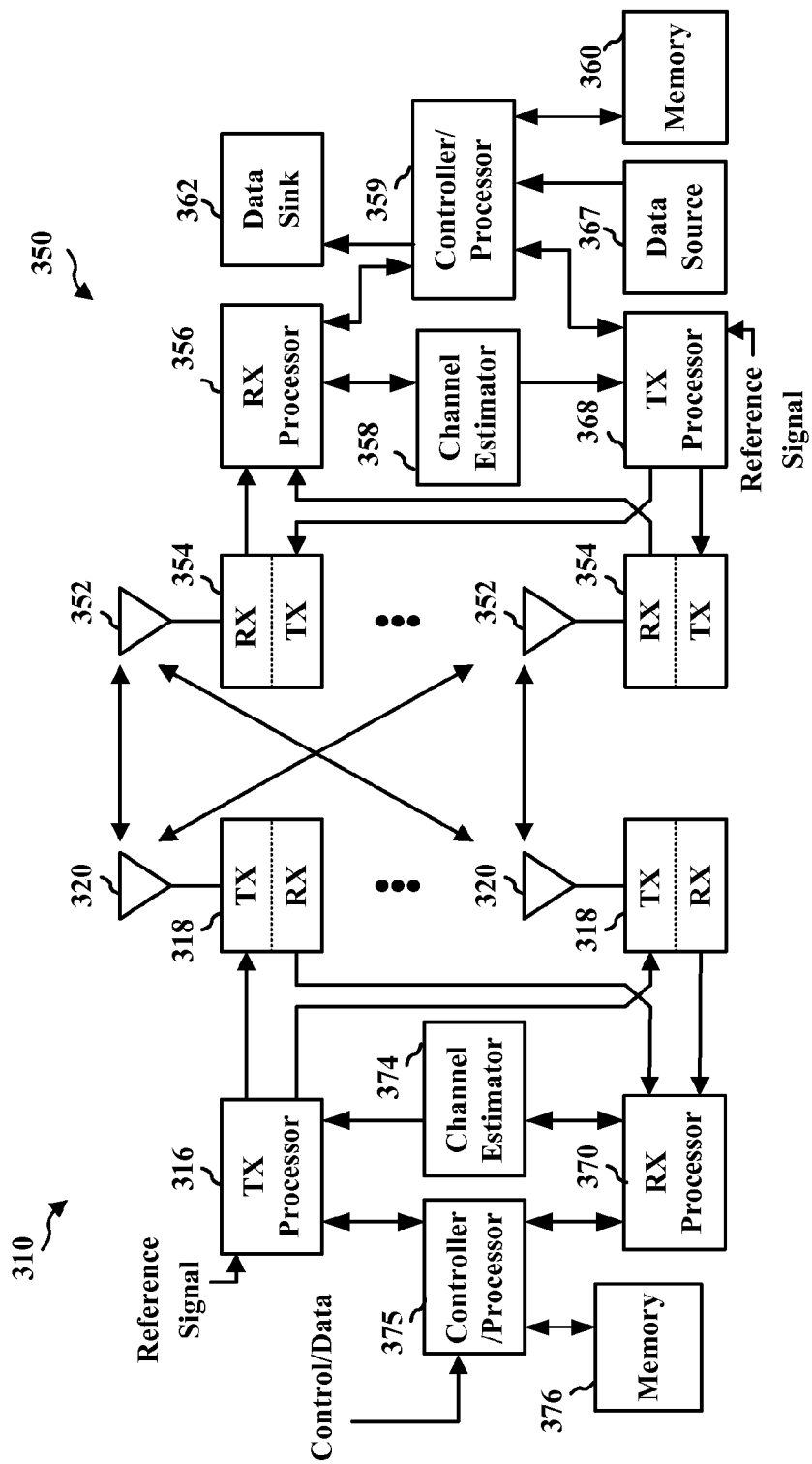
FIG. 3 is a diagram illustrating an example of an evolved Node B and user equipment in an access network according to one embodiment.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
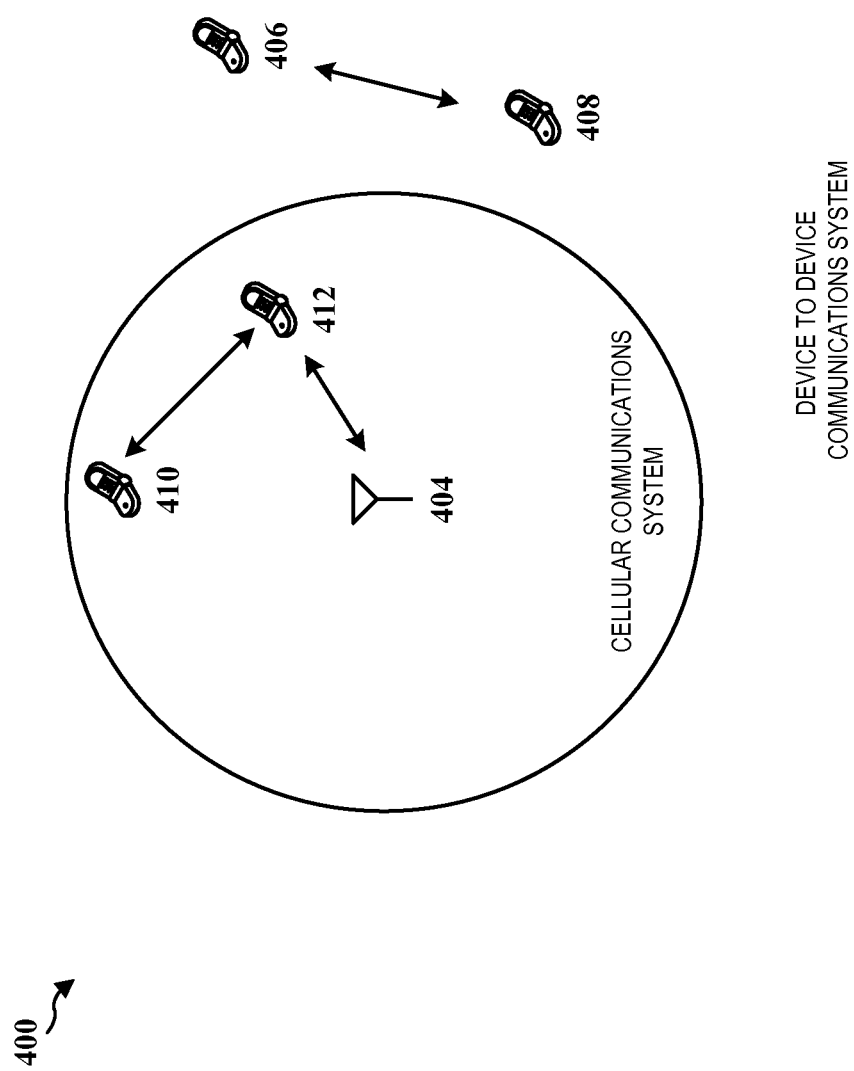
FIG. 4 is a diagram of an exemplary device-to-device (D2D) communications system according to one embodiment.

FIG. 4 is a diagram 400 of an exemplary device-to-device (D2D) communications system. The device-to-device communications system 400 includes a plurality of wireless devices 406, 408, 410, 412. The device-to-device communications system 400 may overlap with a cellular communications system, such as for example, a wireless wide area network (WWAN) (e.g., access network 200). Some of the wireless devices 406, 408, 410, 412 may communicate together in device-to-device communication, some may communicate with the base station 404, and some may do both. Device-to-device communication may be effectuated by directly transferring signals between the wireless devices. Thus, the signals need not traverse through an access node (e.g., a base station) or centrally managed network. Device-to-device communication may provide short range, high data rate communication (e.g., within a home or office type setting). As shown in FIG. 4, the wireless devices 406, 408 are in device-to-device communication and the wireless devices 410, 412 are in device-to-device communication. The wireless device 412 is also communicating with the base station 404.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

In an aspect, a multicast communication system provides for the transport of data from one or multiple senders to multiple receivers. Wireless multicast problems with respect to ad hoc device-to-device communications may be considered. In ad hoc device-to-device communication environments, because of the lack of centralized coordination, it is problematic to bootstrap a "multicast" session among the peer devices. A broadcast transmission may refer to transmitting information to be received by all devices on a network. A multicast transmission may refer to transmitting information to be received by a specific group of devices on the network. Hence, a multicast or broadcast data transmission may refer to a signal or message that is transmitted to a plurality of endpoints. In particular, the multicast or broadcast data transmission may be transmitted once to be received by a plurality of receivers at, or near, the same time.

A traditional approach for a multicast communication system is to invoke a "multicast group manage" protocol (e.g., Internet group management protocol (IGMP)), so that device nodes can choose to "invite" peer devices into, or "join," a specific multicast group, and "query" the existence of group members. However, for battery-powered wireless devices conserving battery life, device transceivers are not always activated (turned "on") unless already being actively engaged in an ongoing communication session. Therefore, wireless devices are not always available to receive/transmit control signaling such as "invite" or "join" or "query". Hence, the group member devices' existence may not always be confirmed. Consequently, without confirmation of receiver existence, a sender's wireless multicast transmission may be futile thus wasting radio resources and device energy. Similarly, the receiver may not always be awake to receive multicast datagrams because it does not know when a multicast sender will be present or start transmitting. Also, the receiver may not be aware of the occurrence of the multicast datagrams since constantly being awake to receive such multicast datagrams is detrimental to the receiver as it negatively impacts device power efficiency.

In an aspect, a device may perform a power efficient discovery stage prior to sending multicast data transmissions. For example, during a discovery period, devices within range of each other may periodically wake to monitor a discovery channel. As such, devices wishing to communicate data with each other may exchange discovery messages on the discovery channel to confirm each other's availability for multicast traffic, prior to exchanging data on a data channel. The devices periodically wake during the discovery period to conserve battery life, and are not expected to monitor the discovery channel at all times. Thus, the discovery channel is coordinated so that devices can monitor the discovery channel during certain times and sleep during other times.

The exchanged discovery messages may be in an expression-format suitable for transmission on the discovery channel. Expressions may specify a pattern of character strings and used to indicate certain information (e.g., discovery information). In an aspect, a sender and receiver(s) may indicate their respective intentions to initiate or join a multicast session by transmitting a corresponding expression during a discovery period on the discovery channel. Like discovery messages, expressions indicating an intention to initiate or join a multicast session may be transmitted in a very power efficient way with a low duty cycle. Accordingly, devices can easily learn of the interest for a multicast session without having to wake any more than they are accustomed. Once the sender or receiver(s) detects peer interest for a multicast session via the discovery method, the sender or receiver(s) will switch from an idle state to a non-idle state and proceed to send/receive the multicast data transmission (multicast datagram).

Figure 5:
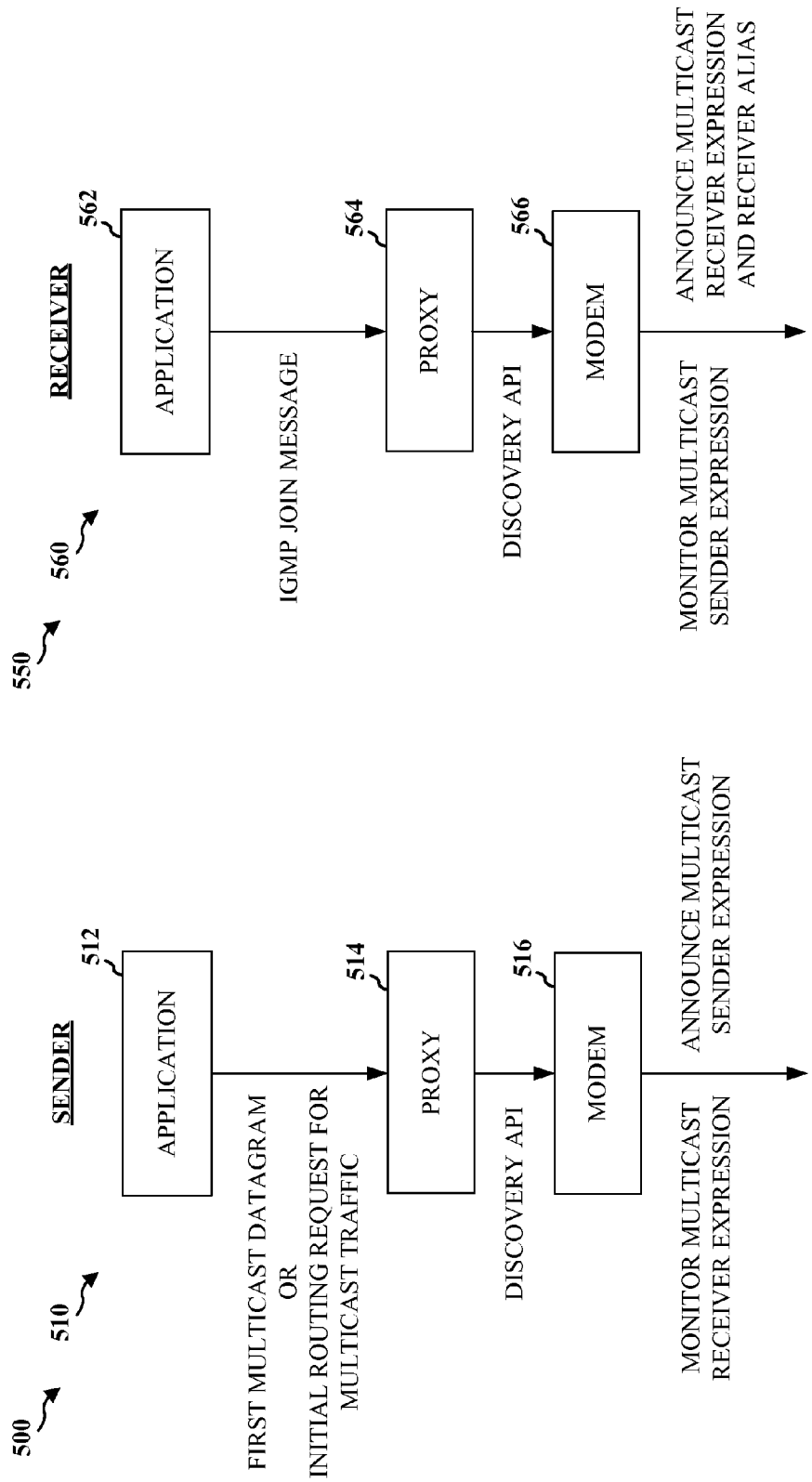
FIGS. 5A and 5B are diagrams illustrating a proxy-based approach for invoking discovery for a multicast group according to one embodiment.

FIGS. 5A and 5B are diagrams 500 and 550, respectively, illustrating a proxy-based approach for invoking discovery for a multicast group. A discovery proxy may be used to support a power-efficient way of coordinating multicast transmission (e.g., Internet Protocol (IP) multicast transmission) and reception in a device-to-device (D2D) network. A multicast transmission may be initiated by a streaming application of one device to nearby receivers. Moreover, a multicast group identifier or specific group address (e.g., IP multicast address "224.129.1.1") may be selected for the multicast group.

Referring to FIG. 5A, an application 512 may be invoked at a sender device 510 to begin streaming of the multicast transmission. If the application 512 were to spontaneously transmit multicast data, a problem may occur in that receivers may not know that the multicast data is being transmitted, and therefore may not listen at the correct time to receive the multicast data since the receivers are asleep much of the time to conserve battery life. Accordingly, a sender proxy (daemon) 514 installed at the sender device 510 may help solve the problem by detecting the application 512's desire to transmit the multicast data to a multicast group and sending, at the appropriate time, a multicast expression describing the multicast group on a discovery channel. In an aspect, D2D devices within range of each other may already be configured to periodically wake to monitor the discovery channel. Thus, by the sender proxy 514 sending the multicast expression on the discovery channel, the D2D devices can easily learn of the multicast group without having to wake any more than they are accustomed.

After the sender proxy 514 detects the application 512's desire to transmit the multicast data, the sender proxy 514 is triggered to translate the desire or information related to a multicast session into a format accepted on a discovery channel, e.g., translated into certain expression(s) based on a multicast group identifier (multicast address). The expressions may be used to identify the sender(s) and receivers of the multicast group. The sender proxy 514 may wait until an appropriate time to send an expression on the discovery channel. For example, the sender proxy 514 may ask a sender modem 516 to transmit (announce) a "multicast sender expression" on the discovery channel (via an application programming interface (API)) at a time when the other devices are awake to monitor (listening to) the discovery channel. The sender proxy 514 may also ask the sender modem 516 to monitor the discovery channel to receive any "multicast receiver expression" at a time when the other devices are awake to monitor (transmitting on) the discovery channel.

Referring to FIG. 5B, at a receiver device 560, a message (e.g., IGMP join message) from a receiver application 562 indicating the receiver 560's desire to join the multicast group may be received (intercepted) by a receiver proxy 564. Similar to the sender proxy 514 of FIG. 5A, the receiver proxy 564 will translate the desire or information related to the multicast session into a format accepted on the discovery channel, e.g., translated into certain expression(s) based on the multicast group identifier (multicast address). The receiver proxy 514 may wait until an appropriate time to send an expression on the discovery channel. For example, the receiver proxy 564 may ask a receiver modem 566 to transmit (announce) a "multicast receiver expression" on the discovery channel (via an API) at a time when other devices are awake to monitor (listening to) the discovery channel. The multicast receiver expression may include some optional distinctive information describing the receiver device (e.g., receiver alias). The receiver proxy 564 may also ask the receiver modem 566 to monitor the discovery channel to receive any "multicast sender expression" at a time when the other devices are awake to monitor (transmitting on) the discovery channel.

Once the sender 510 detects the announcement of at least one receiver's "multicast receiver expression" via the discovery channel, the sender proxy 514 is notified. The sender proxy 514 then requests the sender modem 516 to switch to a non-idle state (e.g., "active" or "connected" state) and start the transmission of the multicast data on the radio interface.

Similarly, once the receiver 560 detects the announcement of a sender's "multicast-sender expression" via the discovery channel, the receiver proxy 564 is notified. The receiver proxy 564 then requests the receiver modem 566 to switch to a non-idle state (e.g., "active" or "connected" state) and start the reception of the multicast data on the radio interface from sender 510.

The expressions may be generated in a number of ways. An expression may be generated having either a direct format or a hashed format. In an example of the direct format, the multicast group identifier (multicast address) may be an IPv4 address and the expression transmitted in the discovery channel may have a total of 64 bits. The direct format expression may include: 1) a 32-bit IPv4 multicast address for the group; 2) a 1-bit sender/receiver indication; and 3) a 31-bit discriminator to distinguish from other sender/receivers.

The hashed format expression may include: 1) a 32-bit time-varying base portion, which is previously known by all senders and receivers of the multicast group); and 2) a 32-bit discriminator portion. Notably, for the base of the hashed expression, the sender expression may be a hash of the multicast address and a sender identity. The receiver expression may be a hash of the multicast address and a receiver identity.

Figure 6:
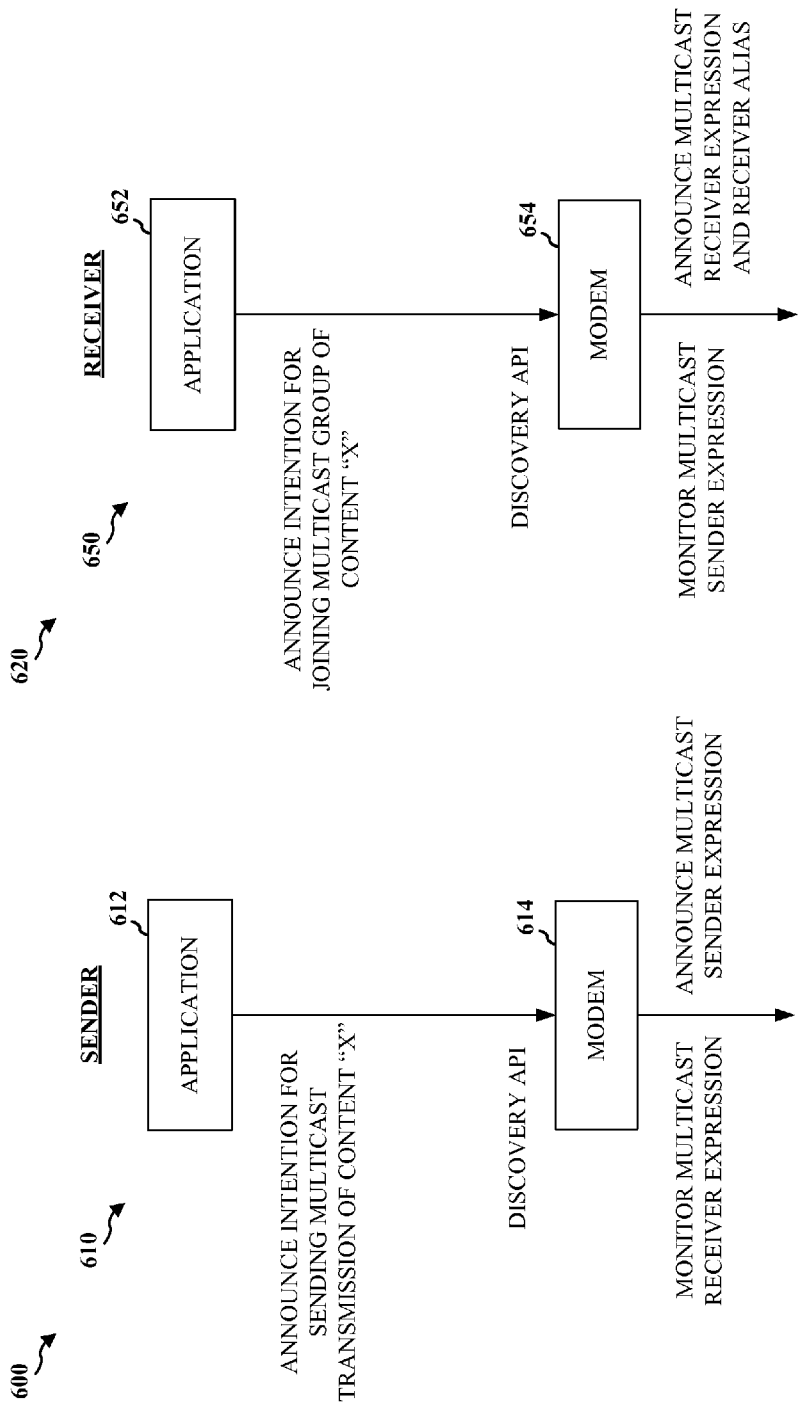
FIGS. 6A and 6B are diagrams illustrating discovery within a multicast group without use of a proxy according to one embodiment.

FIGS. 6A and 6B are diagrams 600 and 620, respectively, illustrating discovery within a multicast group without use of a proxy. Referring to FIGS. 6A and 6B, discovery for a power-efficient multicast transmission (e.g., Layer-2 multicast transmission) in a D2D network will be described. Here, a multicast application itself may be compatible with a peer discovery application programming interface (API). Thus, a proxy may not be needed. Moreover, a sender device may stream content X to peer receiver devices.

Referring to FIG. 6A, at a sender device 610, a sender application 612 may indicate an intention to send a multicast transmission of content X by creating expressions used to identify sender(s) of a multicast group for the content X. The sender application 612 then uses a sender discovery API to trigger a sender modem 614 to use a discovery channel to announce a "multicast sender expression for X" and monitor for any "multicast receiver expression" indicating interest for the content X. The sender expression may contain some optional distinctive information to differentiate a particular sender device/application from that of other senders which also multicasts content X.

Referring to FIG. 6B, at a receiver device 650, a receiver application 652 may indicate an intention to join a multicast group of the content X as a receiver by also creating expressions used to identify receiver(s) of the multicast group for the content X. The receiver application 652 then uses a receiver discovery API to trigger a receiver modem 654 to use a discovery channel to monitor for the "multicast sender expression for X," and also announce a "multicast receiver expression" to indicate interest for the content X. The receiver expression may contain some optional distinctive information describing the receiver device 650 which also receives content X.

Once the sender device 612 detects the announcement of at least one receiver device's multicast receiver expression, the sender application 612 is notified. The sender application 612 then requests the sender modem 614 to switch to a non-idle state (e.g., "active" or "connected" state) and start the transmission of the multicast data on the radio interface.

Similarly, once the receiver device 650 detects the announcement of a sender's multicast sender expression, the receiver application 652 is notified. The receiver application 652 then requests the receiver modem 654 to switch to a non-idle state (e.g., "active" or "connected" state) and start the reception of the multicast data on the radio interface.

Figure 7:
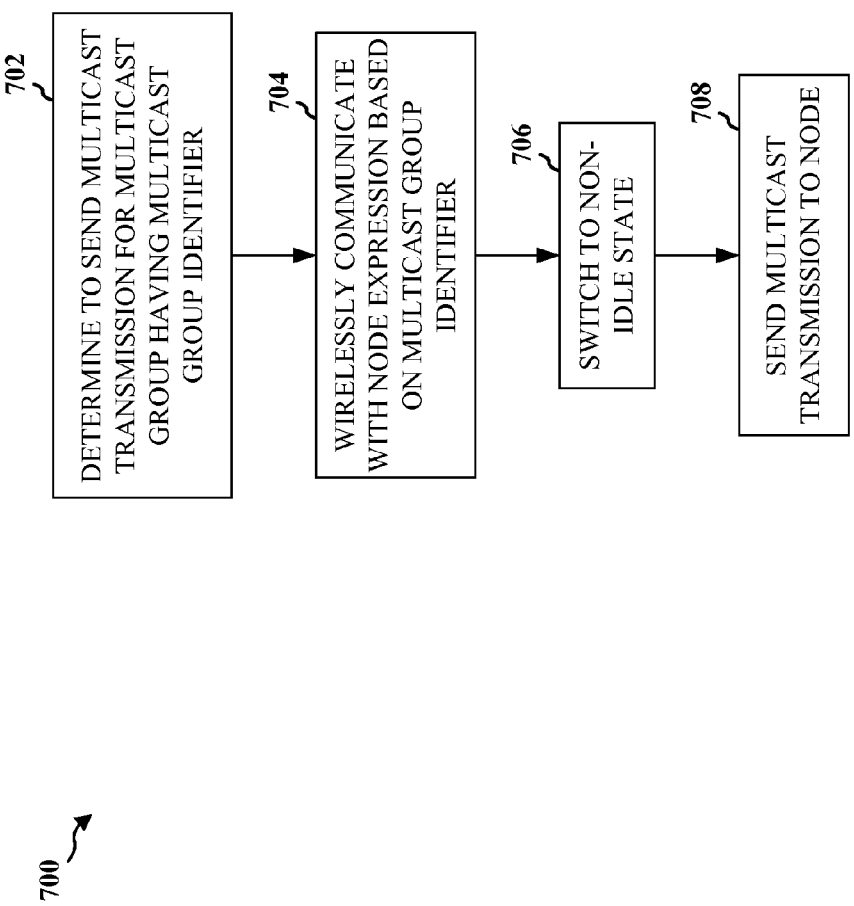
FIG. 7 is a flow chart of a method of wireless communication according to one embodiment.

FIG. 7 is a flow chart 700 of a method of wireless communication of a data source. The method may be performed by a UE. At step 702, the UE determines to send a multicast transmission for a multicast group having a multicast group identifier. At step 704, the UE wirelessly communicates an expression with at least one node in the multicast group. The expression may be based on, and in some cases may include, the multicast group identifier. At step 708, the UE transmits the multicast transmission and at least one node receives the multicast transmission.

In one example, wirelessly communicating the expression may include receiving an indication that the at least one node is ready to receive the multicast transmission. Also, receiving the indication that the at least one node is ready to receive the multicast transmission indicates that the at least one node is within a direct communication range of the UE. Accordingly, at step 706, a modem or transceiver at the UE switches to a non-idle state prior to sending the multicast transmission to the at least one node (step 708) in response to receiving the indication from the at least one node. Here, the multicast transmission may be transmitted once for all nodes that indicated a readiness to receive the multicast transmission.

Alternatively, wirelessly communicating the expression may include transmitting an indication that the UE is ready to transmit the multicast transmission to the at least one node. The expression may be wirelessly communicated on a discovery channel, and the multicast transmission may be sent on a data channel distinct from the discovery channel. Prior to communicating the expression, the UE may determine that the at least one node is not present to receive its multicast transmission based on information indicated in the discovery channel. Accordingly, the UE may wait to receive a receiver expression from the at least one node prior to wirelessly communicating a sender expression. On the other hand, the UE may communicate the sender expression without first receiving the receiver expression from the at least one node.

In an aspect, the UE and the at least one node need to be synchronized to use the discovery channel to exchange expressions. That is, an expression transmitter (UE or node) needs to know or believe that all potential expression receivers are concurrently awake with the expression transmitter when the expression is to be announced. Thus, if the expression transmitter determines that the expression receiver is not concurrently awake with the expression transmitter to exchange expressions on the discovery channel, the expression transmitter may wait until the expression receiver is concurrently awake with the expression transmitter to wirelessly communicate the expression.

Figure 8:
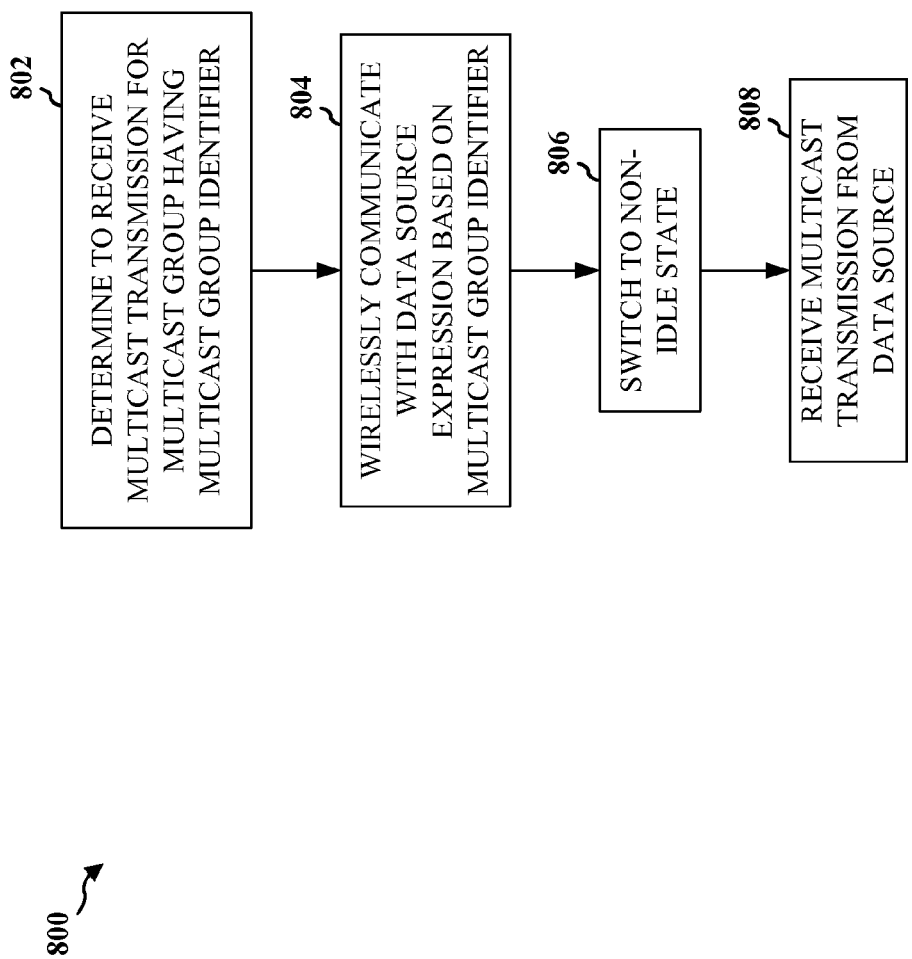
FIG. 8 is a flow chart of a method of wireless communication according to one embodiment.

FIG. 8 is a flow chart 800 of a method of wireless communication of a data receiver. The method may be performed by a UE. At step 802, the UE determines to receive a multicast transmission for a multicast group having a multicast group identifier. The UE may determine to receive the multicast transmission by determining to join the multicast group. At step 804, the UE wirelessly communicates an expression with a data source in the multicast group. The expression may be based on the multicast group identifier. At step 808, the UE receives the multicast transmission from the data source.

In one example, wirelessly communicating the expression may include receiving an indication that the data source is ready to transmit the multicast transmission. Also, receiving the indication that the data source is ready to transmit the multicast transmission indicates that the data source is within a direct communication range of the UE. Accordingly, at step 806, a modem or transceiver at the UE switches to a non-idle state prior to receiving the multicast transmission from the data source (step 808) in response to receiving the indication from the data source.

Alternatively, wirelessly communicating the expression may include transmitting an indication that the UE is ready to receive the multicast transmission from the data source. The expression may be wirelessly communicated on a discovery channel, and the multicast transmission may be received on a data channel distinct from the discovery channel. Prior to communicating the expression, the UE may determine that the data source is not present to send the multicast transmission based on information indicated in the discovery channel. Accordingly, the UE may wait to receive a sender expression from the data source prior to wirelessly communicating a receiver expression. On the other hand, the UE may communicate the receiver expression without first receiving the sender expression from the data source.

In an aspect, the UE and the data source need to be synchronized to use the discovery channel to exchange expressions. That is, an expression transmitter (UE or data source) needs to know or believe that all potential expression receivers are concurrently awake with the expression transmitter when the expression is to be announced. Thus, if the expression transmitter determines that the expression receiver is not concurrently awake with the expression transmitter to exchange expressions on the discovery channel, the expression transmitter may wait until the expression receiver is concurrently awake with the expression transmitter to wirelessly communicate the expression.

Figure 9:
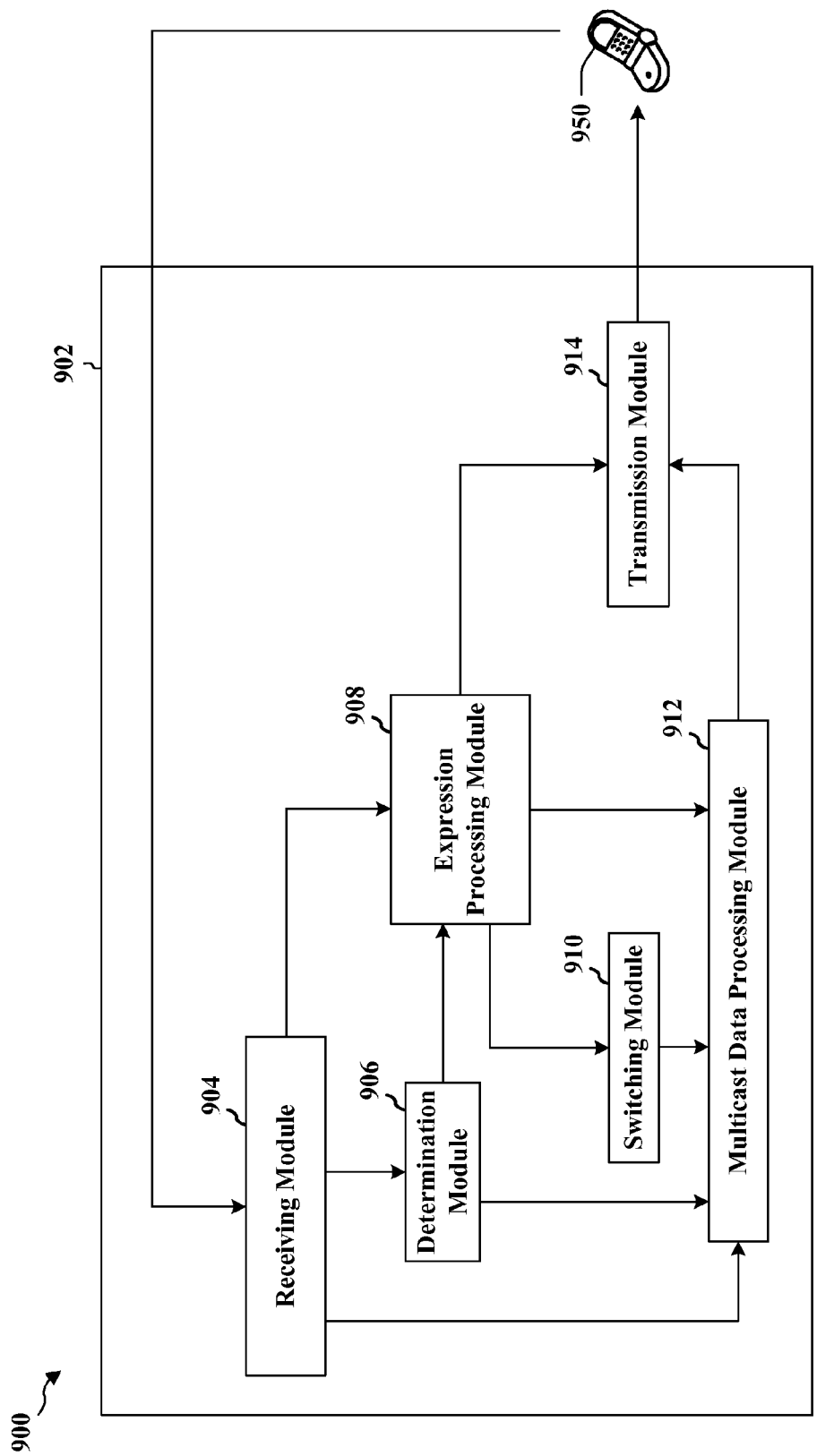
FIG. 9 is a conceptual data flow diagram illustrating the data flow between different modules/means/components in an exemplary apparatus according to one embodiment.

FIG. 9 is a conceptual data flow diagram 900 illustrating the data flow between different modules/means/components in an exemplary apparatus 902. The apparatus may be a UE. The apparatus includes a receiving module 904, a determination module 906, an expression processing module 908, a switching module 910, a multicast data processing module 912, and a transmission module 914.

In an aspect, the apparatus 902 may be a data source and at least one node 950 may be a data receiver. The determination module 906 determines to send a multicast transmission for a multicast group having a multicast group identifier. The expression processing module 908 wirelessly communicates (via the transmission module 914) an expression with at least one node 950 in the multicast group. The expression may be based on the multicast group identifier. The multicast data processing module 912 sends the multicast transmission (via the transmission module 914) to the at least one node 950.

In one example, wirelessly communicating the expression may include the expression processing module 908 receiving an indication (via the receiving module 904) that the at least one node 950 is ready to receive the multicast transmission. Also, receiving the indication that the at least one node 950 is ready to receive the multicast transmission indicates that the at least one node 950 is within a direct communication range of the apparatus 902. Accordingly, the switching module 910 switches to a non-idle state prior to the multicast data processing module 912 sending the multicast transmission (via the transmission module 914) to the at least one node 950 in response to the expression processing module 908 receiving the indication from the at least one node 950.

Alternatively, wirelessly communicating the expression may include the expression processing module 908 transmitting an indication (via the transmission module 914) that the apparatus 902 is ready to transmit the multicast transmission to the at least one node 950. The expression may be wirelessly communicated on a discovery channel, and the multicast transmission may be sent on a data channel distinct from the discovery channel. Prior to communicating the expression, the expression processing module 908 may determine that the at least one node 950 is not present to receive its multicast transmission based on information indicated in the discovery channel. Accordingly, the expression processing module 908 may wait to receive a receiver expression from the at least one node 950 prior to wirelessly communicating a sender expression. On the other hand, the expression processing module 908 may communicate the sender expression without first receiving the receiver expression from the at least one node 950.

In an aspect, the apparatus 902 and the at least one node 950 need to be synchronized to use the discovery channel to exchange expressions. That is, an expression transmitter (apparatus 902 or node 950) needs to know or believe that all potential expression receivers are concurrently awake with the expression transmitter when the expression is to be announced. Thus, if the expression transmitter determines that the expression receiver is not concurrently awake with the expression transmitter to exchange expressions on the discovery channel, the expression transmitter may wait until the expression receiver is concurrently awake with the expression transmitter to wirelessly communicate the expression.

In another aspect, the apparatus 902 may be a data receiver and the node 950 may be a data source. Accordingly, the determination module 906 determines to receive a multicast transmission for a multicast group having a multicast group identifier. The determination module 906 may determine to receive the multicast transmission by determining to join the multicast group and/or detecting an Internet Group Management Protocol (IGMP) join message.

The expression processing module 908 wirelessly communicates an expression (via the transmission module 914) with a data source 950 in the multicast group. The expression may be based on the multicast group identifier. The multicast data processing module 912 receives the multicast transmission (via the receiving module 904) from the data source 950.

In one example, wirelessly communicating the expression may include the expression processing module 908 receiving an indication (via the receiving module 904) that the data source 950 is ready to transmit the multicast transmission. Also, receiving the indication that the data source 950 is ready to transmit the multicast transmission indicates that the data source 950 is within a direct communication range of the apparatus 902. Accordingly, the switching module 910 switches to a non-idle state prior to the multicast data processing module 912 receiving the multicast transmission (via the receiving module 904) from the data source 950 in response to the expression processing module 908 receiving the indication from the data source 950.

Alternatively, wirelessly communicating the expression may include the expression processing module 908 transmitting an indication (via the transmission module 914) that the apparatus 902 is ready to receive the multicast transmission from the data source 950. The expression may be wirelessly communicated on a discovery channel, and the multicast transmission may be received on a data channel distinct from the discovery channel. Prior to communicating the expression, the expression processing module 908 may determine that the data source 950 is not present to send the multicast transmission based on information indicated in the discovery channel. Accordingly, the expression processing module 908 may wait to receive a sender expression from the data source 950 prior to wirelessly communicating a receiver expression. On the other hand, the expression processing module 908 may communicate the receiver expression without first receiving the sender expression from the data source 950.

In an aspect, the apparatus 902 and the data source 950 need to be synchronized to use the discovery channel to exchange expressions. That is, an expression transmitter (apparatus 902 or data source 950) needs to know or believe that all potential expression receivers are concurrently awake with the expression transmitter when the expression is to be announced. Thus, if the expression transmitter determines that the expression receiver is not concurrently awake with the expression transmitter to exchange expressions on the discovery channel, the expression transmitter may wait until the expression receiver is concurrently awake with the expression transmitter to wirelessly communicate the expression.

The apparatus may include additional modules that perform each of the steps of the algorithm in the aforementioned flow charts of FIGS. 7-8. As such, each step in the aforementioned flow charts of FIGS. 7-8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
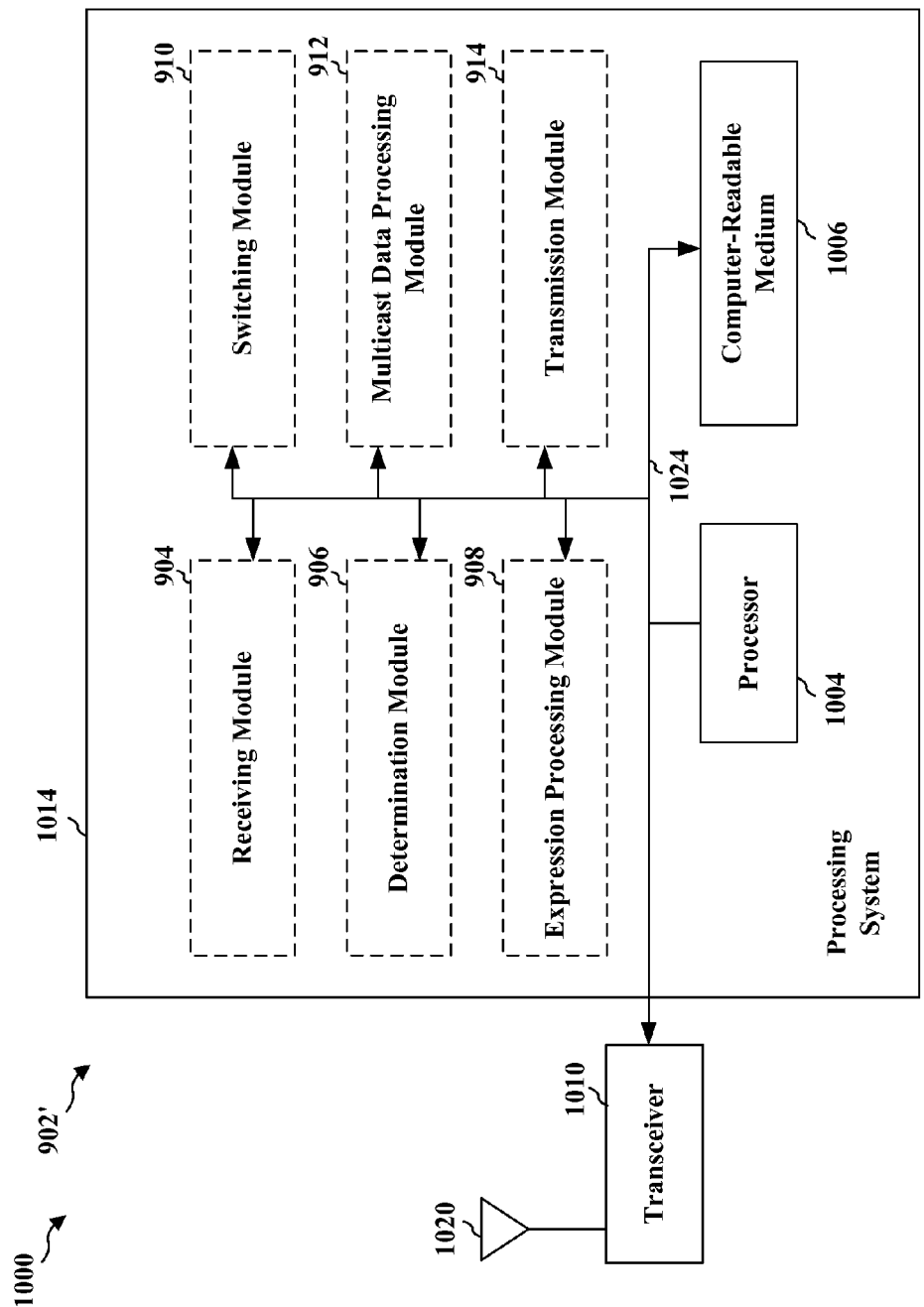
FIG. 10 is a diagram illustrating an example of a hardware implementation for an apparatus employing a processing system according to one embodiment.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, 914, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the receiving module 904. In addition, the transceiver 1010 receives information from the processing system 1014, specifically the transmission module 914, and based on the received information, generates a signal to be applied to the one or more antennas 1020. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, 912, and 914. The modules may be software modules running in the processor 1004, resident/stored in the computer readable medium 1006, one or more hardware modules coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining to send a multicast transmission for a multicast group having a multicast group identifier, means for wirelessly communicating an expression with at least one node in the multicast group, the expression based on the multicast group identifier, means for sending the multicast transmission to the at least one node, means for switching to a non-idle state and sending the multicast transmission to the at least one node in response to receiving the indication from the at least one node, means for determining to receive a multicast transmission for a multicast group having a multicast group identifier, means for wirelessly communicating an expression with a data source in the multicast group, the expression based on the multicast group identifier, means for receiving the multicast transmission from the data source, and means for switching to a non-idle state and receiving the multicast transmission from the data source in response to receiving the indication from the data source.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a sender user equipment (UE), comprising:

determining, at the sender UE, to send a multicast transmission for a multicast group having a multicast group identifier;

wirelessly communicating, from the sender UE, an expression, indicating an intention to initiate the multicast transmission, with at least one receiver UE in the multicast group at a time when the at least one receiver UE is awake and before sending the multicast transmission to the at least one receiver UE, the expression based at least in part on the multicast group identifier, an identifier associated with the sender UE, and a discriminator that distinguishes the sender UE from different sender UEs, wherein the wirelessly communicating the expression comprises:

determining, prior to communicating the expression, whether the at least one receiver UE is concurrently awake with the sender UE to communicate the expression; and receiving an indication that the at least one receiver UE is ready to receive the multicast transmission; and switching to a non-idle state and sending the multicast transmission to the at least one receiver UE in response to receiving the indication from the at least one receiver UE.

2. The method of claim 1, wherein the expression is wirelessly communicated on a discovery channel, and the multicast transmission is sent on a data channel distinct from the discovery channel.

3. The method of claim 2, wherein the wirelessly communicating the expression comprises:

waiting until the at least one receiver UE is concurrently awake with the sender UE to wirelessly communicate the expression.

4. The method of claim 1, wherein the wirelessly communicating the expression comprises transmitting an indication that the-sender UE is ready to transmit the multicast transmission to the at least one receiver UE.

5. The method of claim 1, wherein the receiving the indication that the at least one receiver UE is ready to receive the multicast transmission indicates that the at least one receiver UE is within a direct communication range of the first UE.

6. A method of wireless communication of a receiver user equipment (UE), comprising:

determining, at the receiver UE, to receive a multicast transmission for a multicast group having a multicast group identifier;

wirelessly communicating, from the receiver UE, an expression, indicating an intention to receive the multicast transmission, with a sender UE in the multicast group at a time when the receiver UE is awake and before receiving the multicast transmission from the sender UE, the expression based at least in part on the multicast group identifier, an identifier associated with the receiver UE, and a discriminator that distinguishes the receiver UE from different receiver UEs, wherein the wirelessly communicating the expression comprises:

determining, prior to communicating the expression, whether the sender UE is concurrently awake with the receiver UE to communicate the expression; and receiving an indication that the sender UE is ready to transmit the multicast transmission; and switching to a non-idle state and receiving the multicast transmission from the sender UE in response to receiving the indication from the sender UE.

7. The method of claim 6, wherein the determining to receive the multicast transmission comprises determining to join the multicast group.

8. The method of claim 6, wherein the expression is wirelessly communicated on a discovery channel, and the multicast transmission is received on a data channel distinct from the discovery channel.

9. The method of claim 8, wherein the wirelessly communicating the expression comprises:
waiting until the sender UE is concurrently awake with the receiver UE to wirelessly communicate the expression.

10. The method of claim 6, wherein the wirelessly communicating the expression comprises transmitting an indication that the receiver UE is ready to receive the multicast transmission from the sender UE.

11. The method of claim 6, wherein the indication that the sender UE is ready to transmit the multicast transmission indicates that the sender UE is within a direct communication range of the receiver UE.

12. An apparatus for wireless communication at a sender UE comprising:
means for determining, at the sender UE, to send a multicast transmission for a multicast group having, a multicast group identifier;
means for wirelessly communicating, from the sender UE, an expression, indicating an intention to initiate the multicast transmission, with at least one receiver UE in the multicast group at a time when the at least one receiver UE is awake and before sending the multicast transmission to the at least one receiver UE, the expression based at least in part on the multicast group identifier, an identifier associated with the sender UE, and a discriminator that distinguishes the sender UE from different sender UEs, wherein the means for wirelessly communicating the expression is configured to:
determine, prior to communicating the expression, whether the at least one receiver UE is concurrently awake with the sender UE to communicate the expression; and
receive an indication that the at least one receiver UE is ready to receive the multicast transmission; and
means for switching to a non-idle state and sending the multicast transmission to the at least one receiver UE in response to receiving the indication from the at least one receiver UE.

13. The apparatus of claim 12, wherein the expression is wirelessly communicated on a discovery channel, and the multicast transmission is sent on a data channel distinct from the discovery channel.

14. The apparatus of claim 13, wherein the means for wirelessly communicating the expression is configured to:
wait until the at least one receiver UE is concurrently awake with the sender UE to wirelessly communicate the expression.

15. The apparatus of claim 12, wherein the means for wirelessly communicating the expression is configured to transmit an indication that the sender UE is ready to transmit the multicast transmission to the at least one receiver UE.

16. The apparatus of claim 12, wherein the indication that the at least one receiver UE is ready to receive the multicast transmission indicates that the at least one receiver UE is within a direct communication range of the-sender UE.

17. An apparatus for wireless communication at a receiver user equipment (UE), comprising:

means for determining, at the receiver UE, to receive a multicast transmission for a multicast group having a multicast group identifier;
means for wirelessly communicating, from the receiver UE, an expression, indicating an intention to receive the multicast transmission, with a sender UE in the multicast group at a time when the receiver UE is awake and before receiving, the multicast transmission from the sender UE, the expression based at least in part on the multicast group identifier, an identifier associated with the receiver UE, and a discriminator that distinguishes the receiver UE from different receiver UEs, wherein the means for wirelessly communicating the expression is configured to:
determine, prior to communicating the expression, whether the sender UE is concurrently awake with the receiver UE to communicate the expression; and
receive an indication that the sender UE is ready to transmit the multicast transmission; and
means for switching to a non-idle state and receiving the multicast transmission from the sender UE in response to receiving the indication from the sender UE.

18. The apparatus of claim 17, wherein the means for determining to receive the multicast transmission is configured to determine to join the multicast group.

19. The apparatus of claim 17, wherein the expression is wirelessly communicated on a discovery channel, and the multicast transmission is received on a data channel distinct from the discovery channel.

20. The apparatus of claim 19, wherein the means for wirelessly communicating the expression is configured to:
wait until the sender UE is concurrently awake with the receiver UE to wirelessly communicate the expression.

21. The apparatus of claim 17, wherein the means for wirelessly communicating the expression is configured to transmit an indication that the receiver UE is ready to receive the multicast transmission from the sender UE.

22. The apparatus of claim 17, wherein the indication that the sender UE is ready to transmit the multicast transmission indicates that the sender UE is within a direct communication range of the receiver UE.

23. An apparatus for wireless communication at a sender user equipment (UE), comprising:
a memory; and
at least one processor coupled to the memory and configured to:
determine to send a multicast transmission for a multicast group having a multicast group identifier,
wirelessly communicate an expression, indicating an intention to initiate the multicast transmission, with at least one receiver UE in the multicast group at a time when the at least one receiver UE is awake and before sending the multicast transmission to the at least one receiver UE, the expression based at least in part on the multicast group identifier, an identifier associated with the sender UE, and a discriminator that distinguishes the sender UE from different sender UEs, wherein the at least one processor is configured to wirelessly communicate the expression by:
determining, prior to communicating the expression, whether the at least one receiver UE is concurrently awake with the sender UE to communicate the expression; and
receiving an indication that the at least one receiver UE is ready to receive the multicast transmission; and switch to a non-idle state and send the multicast transmission to the at least one receiver UE in response to receiving the indication from the at least one receiver UE.

24. The apparatus of claim 23, wherein the expression is wirelessly communicated on a discovery channel, and the multicast transmission is sent on a data channel distinct from the discovery channel.

25. The apparatus of claim 24, wherein the at least one processor is configured to wirelessly communicate the expression by:
waiting until the at least one receiver UE is concurrently awake with the sender UE to wirelessly communicate the expression.

26. The apparatus of claim 23, wherein the at least one processor is configured to wirelessly communicate the expression by transmitting an indication that the sender UE is ready to transmit the multicast transmission to the at least one receiver UE.

27. The apparatus of claim 23, wherein the indication that the at least one receiver UE is ready to receive the multicast transmission indicates that the at least one receiver UE is within a direct communication range of the sender UE.

28. An apparatus for wireless communication at a receiver user equipment (UE), comprising:
a memory; and
at east one processor coupled to the memory and configured to:
determine to receive a multicast transmission for a multicast group having a multicast group identifier,
wirelessly communicate an expression, indicating an intention to receive the multicast transmission, with a sender UE in the multicast group at a time when the receiver UE is awake and before receiving the multicast transmission from the sender UE, the expression based at least in part on the multicast group identifier, an identifier associated with the receiver UE, and a discriminator that distinguishes the receiver UE from different receiver UEs, wherein the at least one processor is configured to wirelessly communicate the expression by:
determining, prior to communicating the expression, whether the sender UE is concurrently awake with the receiver UE to communicate the expression; and
receiving an indication that the sender UE is ready to transmit the multicast transmission; and
switch to a non-idle state and receive the multicast transmission from the sender UE in response to receiving the indication from the sender UE.

29. The apparatus of claim 28, wherein the at least one processor is configured to determine to receive the multicast transmission by determining to join the multicast group.

30. The apparatus of claim 28, wherein the expression is wirelessly communicated on a discovery channel, and the multicast transmission is received on a data channel distinct from the discovery channel.

31. The apparatus of claim 30, wherein the at least one processor is configured to wirelessly communicate the expression by:
waiting until the sender UE is concurrently awake with the receiver UE to wirelessly communicate the expression.

32. The apparatus of claim 28, wherein the at least one processor is configured to wirelessly communicate the expression by transmitting an indication that the receiver UE is ready to receive the multicast transmission from the sender UE.

33. The apparatus of claim 28, wherein the indication that the sender UE is ready to transmit the multicast transmission indicates that the sender UE is within a direct communication range of the receiver UE.

34. A non-transitory computer-readable medium storing computer executable code for a sender UE, comprising code to:
determine to send a multicast transmission for a multicast group having a multicast group identifier;
wirelessly communicate an expression, indicating an intention to initiate the multicast transmission, with at east one receiver user equipment (UE) tithe multicast group at a time when the receiver UE is awake and before sending the multicast transmission to the at least one receiver UE, the expression based at least in part on the multicast group identifier, an identifier associated with the sender UE, and a discriminator that distinguishes the sender UE from different sender UEs, wherein the code to wirelessly communicate the expression is configured to:
determine, prior to communicating the expression, whether the at least one receiver UE is concurrently awake with a sender UE to communicate the expression; and
receive an indication that the at least one receiver UE is ready to receive the multicast transmission; and
switch to a non-idle state and send the multicast transmission to the at least one receiver UE in response to receiving the indication from the et least one receiver UE.

35. The non-transitory computer-readable medium of claim 34, wherein the expression is wirelessly communicated on a discovery channel, and the multicast transmission is sent on a data channel distinct from the discovery channel.

36. The non-transitory computer-readable medium of claim 35, wherein the code to wirelessly communicate the expression is configured to:
wait until the at least one receiver UE is concurrently awake with the sender UE to wirelessly communicate the expression.

37. The non-transitory computer-readable medium of claim 34, wherein the code to wirelessly communicate the expression is configured to transmit an indication that the sender UE is ready to transmit the multicast transmission to the at least one receiver UE.

38. The non-transitory computer-readable medium of claim 34, wherein the indication that the at least one receiver UE is ready to receive the multicast transmission indicates that the at least one receiver UE is within a direct communication range of the sender UE.

39. A non-transitory computer-readable medium storing computer executable code for a receiver UE, comprising code to:
determine to receive a multicast transmission for a multicast group having a multicast group identifier;
wirelessly communicate an expression, indicating an intention to receive the multicast transmission, with a sender user equipment (UE) in the multicast group at a time when the receiver UE is awake and before receiving the multicast transmission from the sender UE, the expression based at least in part on the multicast group identifier, an identifier associated with the receiver UE, and a discriminator that distinguishes the sender UE from different receives UEs, wherein the code to wirelessly communicate the expression is configured to:

determine, prior to communicating the expression, whether the sender UE is concurrently awake with the receiver UE to communicate the expression; and receive an indication that the sender UE is ready to transmit the multicast transmission; and switch to a non-idle state and receive the multicast transmission from the sender UE in response to receiving the indication from the sender UE.

40. The non-transitory computer-readable medium of claim 39, wherein the code to determine to receive the multicast transmission is configured to determine to join the multicast group.

41. The non-transitory computer-readable medium of claim 39, wherein the expression is wirelessly communicated on a discovery channel, and the multicast transmission is received on a data channel distinct from the discovery channel.

42. The non-transitory computer-readable medium of claim 41, wherein the code to wirelessly communicate the expression is configured to:

wait until the sender UE is concurrently awake with the receiver UE to wirelessly communicate the expression.

43. The non-transitory computer-readable medium of claim 39, wherein the code to wirelessly communicate the expression is configured to transmit an indication that the receiver UE is ready to receive the multicast transmission from the sender UE.

44. The non-transitory computer-readable medium of claim 39, wherein the indication that the sender UE is ready to transmit the multicast transmission indicates that the sender UE is within a direct communication range of the receiver UE.

* * * * *